United States Patent
Masui et al.

(10) Patent No.: US 9,235,788 B2
(45) Date of Patent: Jan. 12, 2016

(54) IMAGE FORMING APPARATUS, IMAGE FORMING METHOD, AND PRINT SYSTEM

(71) Applicants: Daisuke Masui, Kanagawa (JP); Hiroya Uruta, Tokyo (JP); Tomoyuki Takahira, Kanagawa (JP); Yuka Saito, Tokyo (JP); Naohiko Kubo, Kanagawa (JP); Naoya Tamura, Kanagawa (JP)

(72) Inventors: Daisuke Masui, Kanagawa (JP); Hiroya Uruta, Tokyo (JP); Tomoyuki Takahira, Kanagawa (JP); Yuka Saito, Tokyo (JP); Naohiko Kubo, Kanagawa (JP); Naoya Tamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 61 days.

(21) Appl. No.: 13/903,044

(22) Filed: May 28, 2013

(65) Prior Publication Data
US 2013/0321849 A1 Dec. 5, 2013

(30) Foreign Application Priority Data
May 29, 2012 (JP) .................................. 2012-122231

(51) Int. Cl.
*G06K 15/00* (2006.01)
*G06F 3/12* (2006.01)
*G06K 15/02* (2006.01)
*G03G 15/00* (2006.01)

(52) U.S. Cl.
CPC ............ *G06K 15/1809* (2013.01); *G03G 15/50* (2013.01); *G06F 3/121* (2013.01); *G06F 3/1234* (2013.01); *G06F 3/1285* (2013.01)

(58) Field of Classification Search
USPC ....................................................... 358/1.13
See application file for complete search history.

(56) References Cited

U.S. PATENT DOCUMENTS

| | | | |
|---|---|---|---|
| 2007/0109586 A1* | 5/2007 | Yamada et al. | 358/1.14 |
| 2008/0192289 A1* | 8/2008 | Honda et al. | 358/1.15 |
| 2009/0033992 A1* | 2/2009 | Ogiwara et al. | 358/1.15 |
| 2009/0097064 A1* | 4/2009 | Tominaga | 358/1.15 |
| 2009/0201527 A1* | 8/2009 | Yamada et al. | 358/1.15 |
| 2011/0249285 A1* | 10/2011 | Kobayashi et al. | 358/1.13 |
| 2012/0069356 A1 | 3/2012 | Kubo et al. | |
| 2012/0229852 A1 | 9/2012 | Kubo et al. | |

FOREIGN PATENT DOCUMENTS

| | | |
|---|---|---|
| JP | 11-015614 | 1/1999 |
| JP | 2008-207539 | 9/2008 |

* cited by examiner

*Primary Examiner* — Huo Long Chen
(74) *Attorney, Agent, or Firm* — Harness, Dickey & Pierce, P.L.C.

(57) ABSTRACT

Disclosed is an image forming apparatus including a command receiving unit that receives a print command, a detector that detects a state of the operation unit, and a controller. When the detector detects that the state of the operation unit is a predetermined state subsequent to receiving the print command by the command receiving unit and prior to completion of printing based on the print command, the controller causes the printing to be terminated. When the detector detects that the state of the operation unit is not the predetermined state subsequent to receiving the print command by the command receiving unit and prior to the completion of the printing based on the print command, the controller causes the printing to be executed.

15 Claims, 16 Drawing Sheets

FIG.11

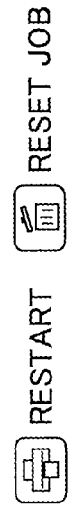

RESTART  RESET JOB  TO PRINTER DOCUMENT PRINT SCREEN>>

◄ ▼ 1/1 ▲ ►  NUMBER OF DISPLAYED ITEMS: 10 ▼

NUMBER OF JOBS: 10

| ATTRIB-UTE | ID | NAME | USER NAME | USER ID | DOCUMENT NAME | STATE | DATE AND TIME OF CREATION | NUMBER OF PAGES |
|---|---|---|---|---|---|---|---|---|
| ○ | 10 | OGAWA | kogawa | ogawa | WORD PROCESSING SOFTWARE_Tk10.doc | JOB INTERRUPTED | 2005/6/8 13:55:29 | 0 |
| ○ | 8 | OGAWA | kogawa | ogawa | WORD PROCESSING SOFTWARE_Tk8.doc | JOB INTERRUPTED | 2005/6/8 13:52:31 | 0 |
| ○ | 7 | OGAWA | kogawa | ogawa | WORD PROCESSING SOFTWARE_Tk7.doc | JOB INTERRUPTED | 2005/6/8 13:50:47 | 0 |
| ○ | 6 | OGAWA | kogawa | ogawa | WORD PROCESSING SOFTWARE_Tk6.doc | JOB INTERRUPTED | 2005/6/8 13:48:22 | 0 |
|  | 9 | SAITO | saitohy | saitohy | WORD PROCESSING SOFTWARE_DOCUMENT 1 | JOB COMPLETED | 2005/6/8 13:54:20 | 10 |
|  | 5 | SAITO | saitohy | saitohy | WORD PROCESSING SOFTWARE_EASY.doc | JOB COMPLETED | 2005/6/8 13:43:25 | 10 |
|  | 4 | SAITO | saitohy | saitohy | WORD PROCESSING SOFTWARE_(^).doc | JOB COMPLETED | 2005/6/8 13:41:33 | 10 |
|  | 3 | OGAWA | kogawa | ogawa | WORD PROCESSING SOFTWARE_Tk3.doc | JOB COMPLETED | 2005/6/8 13:38:10 | 10 |
|  | 2 | OGAWA | kogawa | ogawa | WORD PROCESSING SOFTWARE_Tk2.doc | JOB COMPLETED | 2005/6/8 13:36:07 | 10 |
|  | 1 | YAMADA | yamada | yamada | SCREEN SOFTWARE.vsd | JOB COMPLETED | 2005/6/8 13:31:36 | 10 |

FIG.15

| ATTRIBUTE | JOB ID | USER NAME | USER ID | DOCUMENT NAME | ERROR OCCURRENCE TIME | CONTENTS OF ERROR |
|---|---|---|---|---|---|---|
| ○ | 10 | kogawa | ogawa | WORD PROCESSING SOFTWARE_Tk10.doc | 2005/6/8 13:56:12 | STOPPED |
|   | 8 | kogawa | ogawa | WORD PROCESSING SOFTWARE_Tk10.doc | 2005/6/8 13:52:25 | STOPPED |

IMAGE FORMING APPARATUS, IMAGE FORMING METHOD, AND PRINT SYSTEM

BACKGROUND OF THE INVENTION

1. Field of the Invention

The present invention relates to an image forming apparatus that can detect a malfunction of an operation unit, and that can control execution of a print job.

2. Description of the Related Art

A touch panel has been used for an image forming apparatus according to related art. Due to recent popularization of a smart phone and a tablet computer, operability of a touch panel is improved. For example, text input by flick input and an operation by multi-touch are possible. A main cause of the improvement of the operability may be popularization of an operating system (OS) which is referred to as "Android (registered trademark)." An attempt is made to apply this OS to an operations panel of an image forming apparatus.

In general, robustness and stability of a new OS is improved as upgrading of the new OS is continued. When a new OS is implemented for a touch panel, it is possible that the OS is abnormally terminated (the OS abends) at an unexpected timing during operation.

When an OS is abnormally terminated, a user's operation may not be accepted. Thus, cancellation of a print job may be desirable. A technique is known which is for cancelling a print job (cf. Patent Document 1 (Japanese Unexamined Patent Publication No. 2008-207539), for example). Patent Document 1 discloses an image forming apparatus such that it starts measurement of time after a print job is cancelled by a user by pressing a print stop/restart key, and it restarts the print job at a time at which an elapsed time exceeds the set time, provided that the print stop/restart key is not pressed again.

Unfortunately, according to the image forming apparatus which is disclosed in Patent Document 1, a print job may not be cancelled unless a user performs an operation to cancel the print job. Namely, when the OS is abnormally terminated at the unexpected time, the OS is in a state where the OS is not operable, until the OS is restarted. For example, it is possible that the OS is abnormally terminated immediately after the user erroneously made a print request. When the OS is abnormally terminated, the user may not cancel or stop the printing which is accepted by the operations panel, until the OS is restarted. A problem is that a sheet of paper which is not desired by the user may be output.

In view of the above problem, an objective of the present invention is to provide an image forming apparatus that can prevent outputting of a document during a state where a user may not cancel printing by operating an operations panel.

SUMMARY OF THE INVENTION

According to an aspect of the present invention, there is provided an image forming apparatus including a command receiving unit that receives a first print command, wherein the first print command is input through an operation unit that receives a user's operation; a detector that detects a state of the operation unit; and a controller. When the detector detects that the state of the operation unit is a predetermined state subsequent to receiving the first print command by the command receiving unit and prior to completion of first printing based on the first print command, the controller causes the first printing based on the first print command received by the command receiving unit to be terminated. When the detector detects that the state of the operation unit is not the predetermined state subsequent to receiving the first print command by the command receiving unit and prior to the completion of the first printing based on the first print command, the controller causes the first printing based on the first print command received by the command receiving unit to be executed.

According to another aspect of the present invention, there is provided an image forming method including a command receiving step of receiving a first print command, wherein the first print command is input through an operation unit that receives a user's operation; a detection step of detecting a state of the operation unit; and a control step. When the detection step detects that the state of the operation unit is a predetermined state subsequent to receiving the first print command by the command receiving step and prior to completion of first printing based on the first print command, the control step causes the first printing based on the first print command received by the command receiving step to be terminated. When the detection step detects that the state of the operation unit is not the predetermined state subsequent to receiving the first print command by the command receiving step and prior to the completion of the first printing based on the first print command, the control step causes the first printing based on the first print command received by the command receiving step to be executed.

According to another aspect of the present invention, there is provided a print system that includes an image forming apparatus and an information processing device, wherein the information processing device includes a transmitter that transmits print data to the image forming apparatus. The image forming apparatus includes a first receiver that receives the print data from the information processing device; a command receiving unit that receives a first print command, wherein the first print command is input through an operation unit that receives a user's operation; a detector that detects a state of the operation unit; and a controller. When the detector detects that the state of the operation unit is a predetermined state subsequent to receiving the first print command by the command receiving unit and prior to completion of first printing based on the first print command, the controller causes the first printing based on the first print command received by the command receiving unit to be terminated. When the detector detects that the state of the operation unit is not the predetermined state subsequent to receiving the first print command by the command receiving unit and prior to the completion of the first printing based on the first print command, the controller causes the first printing based on the first print command received by the command receiving unit to be executed.

According to the aspects of the present invention, there can be provided the image forming apparatus that can prevent printing during the state where the user cannot cancel the printing by operating the operation unit.

Other objects, features and advantages of the present invention will become more apparent from the following detailed description when read in conjunction with the accompanying drawings.

BRIEF DESCRIPTION OF THE DRAWINGS

FIG. 11 is a diagram showing an example of a job list which is displayed on the operations panel;

FIG. 15 is a diagram showing an example of an error log;

DETAILED DESCRIPTION OF THE PREFERRED EMBODIMENTS

Hereinafter, a configuration for implementing the present invention is explained by an embodiment while referring the accompanying drawings.

Figure 1:
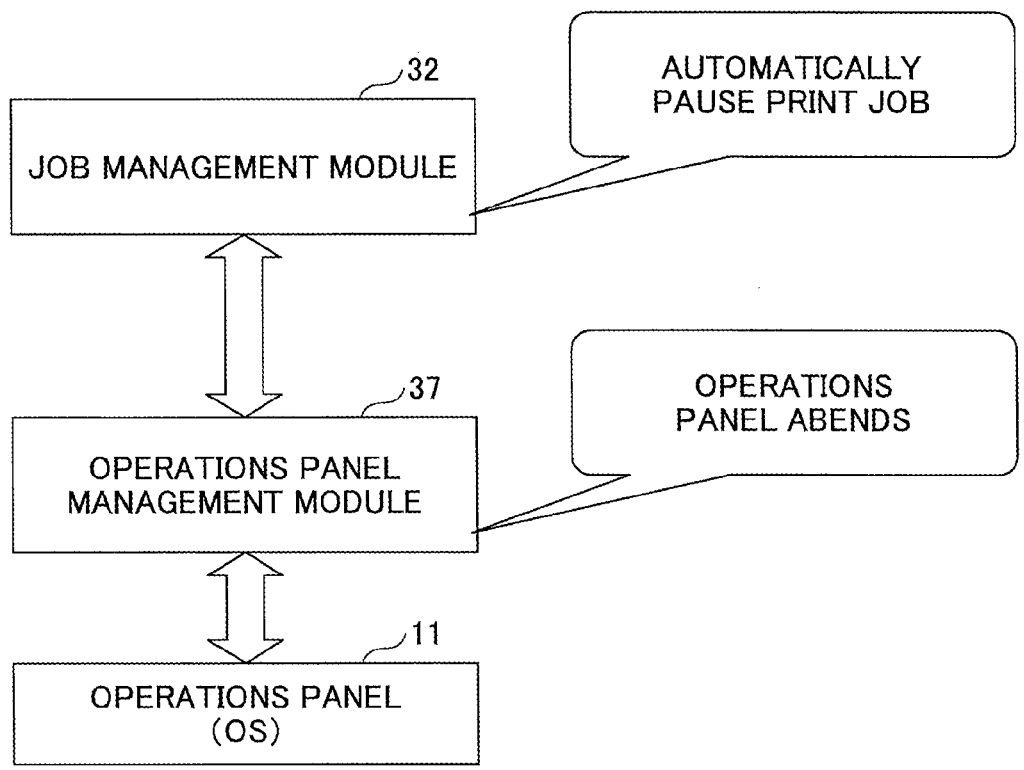
FIG. 1 is a diagram schematically illustrating an example of characteristics of an image forming apparatus according to an embodiment of the present invention in regard to a malfunction of an operations panel.

FIG. 1 is a diagram schematically illustrating an example of characteristics of an image forming apparatus according to the embodiment in regard to a malfunction of an operations panel.

An Android (registered trademark, indication of the "registered trademark" is abbreviated, hereinafter) operating system (OS) is implemented in the operations panel 11 according to the embodiment. An operations panel management module 37 receives the contents of a user's operation, which is received by the operations panel 11, and the operations panel management module 37 controls the contents which are displayed by the operations panel. The operations panel management module 37 communicates with the operations panel 11 by calling an API of Android OS.

The operations panel 11 may abend (abnormally terminated) by an operation of Android OS. Here, the abend means not only turning off a power source or resetting, but also all conditions where an operation of a user is not received, such as a condition where a screen is frozen, or a condition where an unexpected abnormal operation is performed.

The operations panel management module 37 detects an abend of the operations panel 11 by monitoring the operations panel 11. The operations panel management module 37 reports the abend of the operations panel 11 to the job management module. When the job management module receives the report of the abend of the operations panel 11, the job management module interrupts a print job.

When the operations panel 11 abends, the print job is automatically interrupted. Thus, even if the user erroneously requests printing, a document is not output, and thereby an unnecessary cost may be reduced.

Here, after the interruption, the print job is restarted, unless the user deletes the print job by operating the recovered operations panel 11. In this case, the "interruption" means the same as suspending. For a case where the print job is not restarted after the interruption, the "interruption" means the same as canceling (cancellation). In the embodiment, the explanation is given while not strictly differentiating whether the "interruption" eventually becomes the "suspending" or the "cancellation."

Configuration Example

Figure 2:
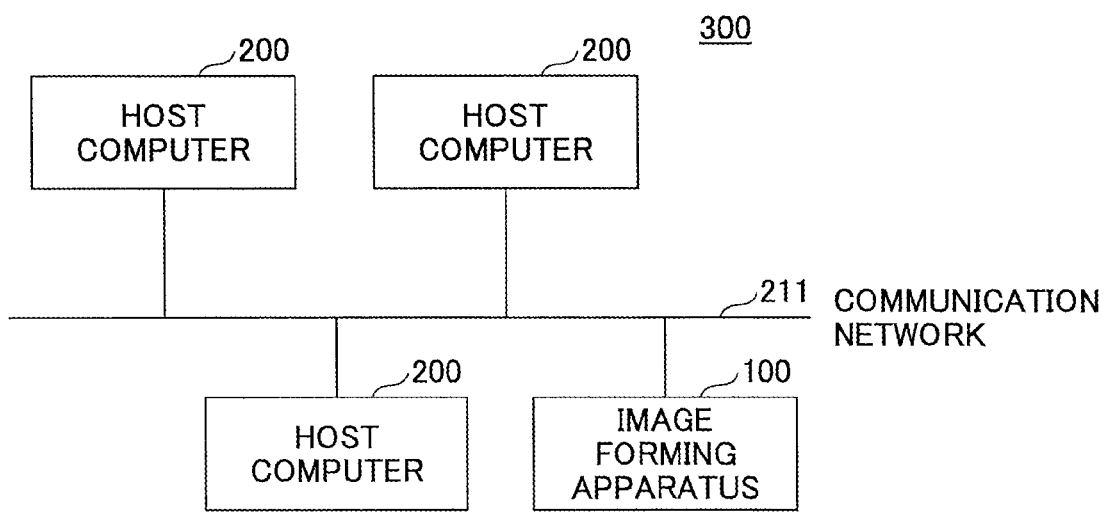
FIG. 2 is a system configuration diagram of an example of a print system including the image forming apparatus.

FIG. 2 shows an example of a system configuration diagram of a print system 300. One or more host computers 200 and an image forming apparatus 100 are connected through a communication network 211. The host computer 200 is a personal computer (PC), for example. Examples of the PC include a laptop, a smart phone, a tablet computer, and the like. The examples of the PC may include a mobile phone and a personal digital assistant (PDA), provided that they are terminals that can request the image forming apparatus 100 to print a document.

The communication network 211 is a LAN, a WAN, or the Internet, for example. The communication network 211 may include a communication network of a telecommunications carrier. A part or all the communication network 211 may be wirelessly connected.

The host computer 200 accepts an operation of a user, and the host computer 200 transmits print data to the image forming apparatus 100 through the communication network 211. The image forming apparatus 100 analyzes the print data and generates image data to be printed. The image forming apparatus 100 prints the image data onto a sheet material such as a sheet of paper.

The image forming apparatus 100 is a printer, for example. The image forming apparatus 100 may be a copier, a facsimile machine, a scanner, or a multifunction peripheral, provided that they include a printing function.

Figure 3:
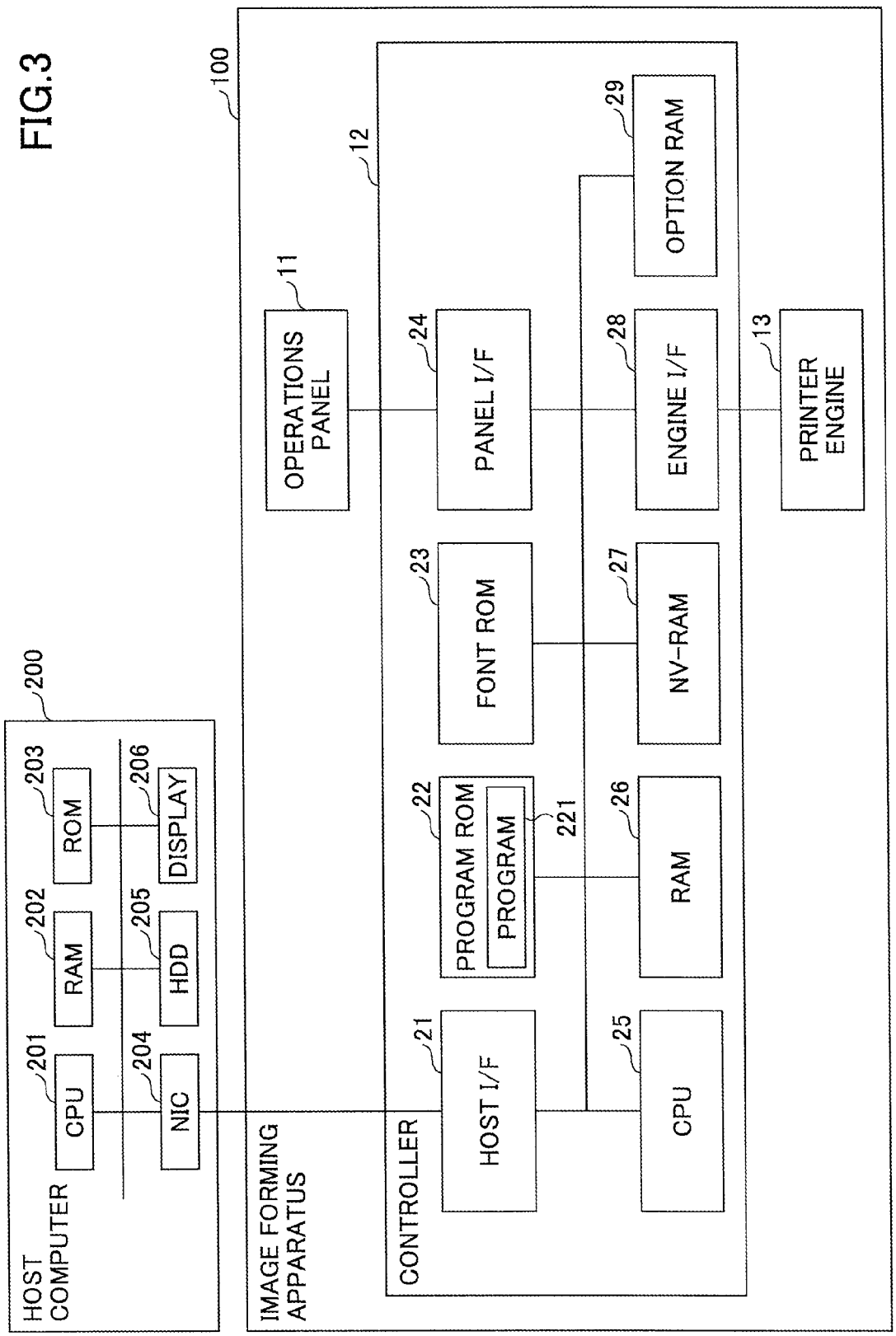
FIG. 3 is a hardware configuration diagram of the example of the image forming apparatus.

FIG. 3 shows an example of a hardware configuration diagram of the image forming apparatus 100 and the host computer 200. The image forming apparatus 100 includes the operations panel 11, a controller 12, and a printer engine 13. The controller 12 includes a host I/F 21, a program ROM 22, a font ROM 23, a panel I/F 24, a CPU 25, a RAM 26, a NV-RAM 27, an engine I/F 28, and an optional RAM 29.

The controller 12 is a generic term of a control mechanism that converts print data which is received from the host computer 200 into image data, and that outputs the image data to the printer engine 13.

The host I/F 21 is a communication interface that connects the host computer 200 and the image forming apparatus 100, so that they can communicate with each other. The host I/F 21 can be embodied by a network card such as a LAN card. The print data and a control signal are transmitted from the host computer 200 to the image forming apparatus 100, and a status signal is transmitted from the image forming apparatus 100 to the host computer 200. The control signal includes a printing condition such as a number of copies to be output, a paper size, presence or absence of duplex printing, presence or absence of aggregate printing, presence or absence of stapling, presence or absence of punching, and/or a paper output destination. Hereinafter, the print data and the control signal are not distinguished, and it is assumed that the control signal is included in the print data. The status signal is a signal that indicates a state of the image forming apparatus. For example, a signal indicating "printing," "waiting," or "turning off the operations panel" is transmitted as the status signal.

Further, there is a case where an access point of a wireless LAN is connected to the communication network 211. The host I/F 211 can communicate with the host computer 200 through the communication network 211 regardless of presence or absence of the access point. Further, the host I/F 21 may be an interface that directly performs radio communication with the host computer 200. In such a case, the host I/F 21 may be an antenna and a communication module of the Bluetooth (registered trademark), for example. A network management module (which is described later) has a so-called "profile," which corresponds to a protocol of a personal area network (PAN), for example.

The CPU 25 controls overall of the controller 12. A program 221 is stored in the program ROM 22. The CPU 25 reads out the program 221 and processes print data and a control signal. The program ROM 22 may be a solid state drive (SSD) in which a flash memory is integrated, for example. Alternatively, the program ROM 22 may be a hard disk drive (HDD). The program 221 is stored in the program ROM 22. The program 221 is for performing processing of the print data, for performing data management in the controller 12 which is associated with the processing of the print data, and for performing functions which are specific to this embodiment. The program 221 may be distributed in a state where the program 221 is stored in a recording medium such as a memory card. Alternatively, the program 221 may be downloaded from a server, and in this manner the program 221 may be distributed.

The RAM 26 is used as a work memory for the CPU 25 to execute the program 221; as a buffer in which the print data received from the host computer 200 is managed on a page-by-page basis, and which temporarily stores the print data; and as a bit map memory that converts the print data stored in the buffer into image data such as a bitmap, and that stores the image data.

The NV-RAM 27 is a non-volatile RAM for storing data, which is to be reserved even after the power supply of the image forming apparatus 100 is turned off. For example, the NV-RAM 27 stores a number of printed sheets. The font ROM 23 stores various types of fonts (e.g., a Ming-style typeface, and a Gothic typeface), which are used for printing.

The engine I/F 28 is an interface that transmits image data and control information from the controller 12 to the printer engine 13, and that receives a status signal which is transmitted from the printer engine 13 to the controller 12.

The printer engine 13 creates and develops an electrostatic latent image on a photosensitive body based on the image data and the control information from the controller 12. The printer engine 13 feeds a transfer paper sheet from a document feeder, and the printer engine 13 forms an image by transferring and fixing the electrostatic latent image onto the transfer paper sheet. The printer engine 13, which is based on an ink-jet method, may be included in the image forming apparatus 100. In this case, the printer engine 13 forms an image on a paper sheet by discharging ink droplets by driving a print head.

The panel I/F 24 is an interface which is for transmitting information such as a state and an operation mode of the image forming apparatus 100 to the operations panel 11, and which is for receiving, by the controller 12, contents of an operation by a user from the operations panel 11.

The operations panel 11 is a display that displays a state, an operation mode, and an operation menu of the image forming apparatus 100. The operations panel 11 is also a command receiving unit that receives a command for switching the operation mode of the image forming apparatus 100, and that receives a command for setting a printing condition and a command for printing from the operation menu. The display may be a liquid crystal display or an organic electroluminescence display, for example. The command receiving unit may correspond to a softkey and a peripheral hardkey, which are formed on the touch panel. The controller 12 can cancel or restart an interrupted print job by retrieving the contents of the operation by the user from the operations panel 11, provided that the operations panel is in a normal condition.

The host computer 200 includes a CPU 201, a RAM 202, a ROM 203, a NIC 204, a HDD 205, and a display 206. The NIC 204 is connected to the image forming apparatus 100 through the communication network 211. The NIC 204 has a function to transmit print data to the image forming apparatus 100.

In the embodiment, Android OS is used for controlling the operations panel 11. Android OS receives an operation on the operations panel 11 by the user. Android OS analyzes a signal from the controller 12, and Android OS displays a screen on the touch panel. In general, a device driver for an OS is prepared in the operations panel 11. Thus, it is assumed that the operations panel 11 integrally includes the device driver of the operations panel 11 as well as Android OS.

The CPU 25 divides print data, which is transmitted from the host computer 200 through the host I/F 21, into image data, print control data, and the like. The image data and the print control data are converted into control information which is to be analyzed by the printer engine 13. The control information is stored in the buffer (RAM 26). Subsequent to converting the print data from the host computer 200 into the image data and the print control data, which correspond to one page, the image data and the print control data are sequentially converted into the control information. Then, a print start command is output to the printer engine 13 through the engine I/F 28.

By the above-described series of procedures, the print data from the host computer 200 is printed through the printer engine.

Figure 4:
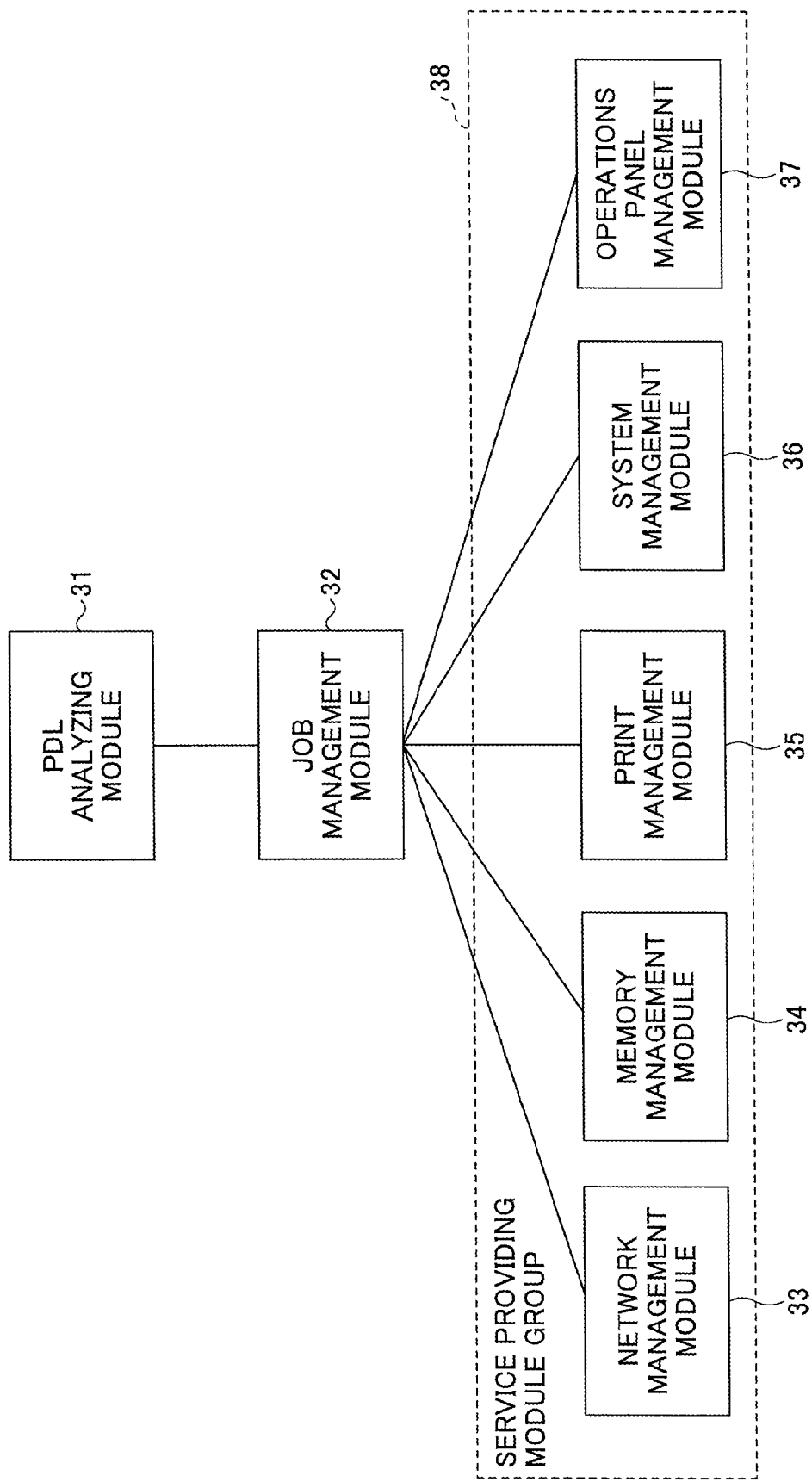
FIG. 4 is a diagram of an example of functional blocks which are provided by executing a program by the image forming apparatus, or an example of a configuration of the program.

FIG. 4 is a diagram of an example of functional blocks which are provided by executing a program by the image forming apparatus 100 (or FIG. 4 is a diagram of an example of a configuration of a program).

For example, the program includes a PDL analyzing module 31 at an upper layer; a job management module 32 at a middle layer; and a service providing module group 38 at a lower layer. The service providing module group 38 includes a network management module 33, a memory management module 34, a print management module 35, a system management module 36, and an operations panel management module 37. From a perspective of the PDL analyzing module 31, the job management module 32 eliminates differences of interfaces of the service providing module group 38. Thus, such a layered structure is effective for rearrangement of the modules. However, the structure of the modules is not limited to the example shown in FIG. 4, provided that communication among the modules is possible.

The PDL analyzing module 31 is a module that analyzes print data received by the image forming apparatus 100, that converts the print data into image data, and that generates control information. Here, "PDL" is an abbreviation of "Page Description Language." The page description language is a language (e.g., PostScript, or ROCL) for indicating text, an image, a position of a graphic, and a control signal to the image forming apparatus 100.

The PDL analyzing module 31 receives a service of the service providing module group 38 through the job management module 32. For example, the PDL analyzing module 31 receives print data from the network management module 33 through the job management module 32. For example, the PDL analyzing module 31 stores image data in a memory, which is reserved by the memory management module 34, through the job management module 32. Device configuration information (e.g., configurations of a paper feed tray and a paper eject tray, a size of a paper sheet in the paper feed tray, and/or presence or absence of a paper sheet) may be required for generating image data. For example, the PDL analyzing module 31 retrieves the device configuration information from the system management module 36 through the job management module 32.

The job management module 32 performs control regarding overall PDL processing. The job management module 32 is a module that mainly relays a process which is requested by the PDL analyzing module 31 and that requests another module to perform the process. Specifically, the job management module 32 performs the following processes.

The job management module 32 generates a print job from print data, which is retrieved from the host computer 200 by the network management module 33, and the job management module 32 registers the print job in a job list.

The job management module 32 retrieves a print command received by the operations panel 11 through the operations panel management module 37, and the job management module 32 generates the print job by associating the print command with the print data and registers the print job in the job list.

The job management module 32 transfers print data, which is retrieved from the host computer 200 by the network management module 33, to the PDL analyzing module 31.

The job management module 32 requests the system management module 36 to retrieve device configuration information, which may be required for the PDL analyzing module 31 to perform the print job.

The job management module 32 requests the memory management module 34 to reserve a memory area, which is required by the PDL analyzing module 31.

The job management module 32 transfers image data and control information, which are generated by the PDL analyzing module 31, to the print management module 35, and the job management module 32 requests the print management module 35 to print the image data onto a paper sheet.

The modules which are included in the service providing module group 38 share a basic operation of the image forming device 100 by communicating with each other. The modules which are included in the service providing module group 38 cooperatively respond to a request from the job management module 32.

The network management module 33 is a module that manages the host I/F 21, and that controls processing of data (which is mainly print data) which is received from the host I/F 21. Main functions of the network management module 33 include performing processing based on a communication protocol (e.g., a file transfer protocol (FTP) or a line printer remote (LPR) protocol) which is indispensable for receiving data from the host computer 200; receiving print data from the host I/F 21; and transferring received data to another module.

The memory management module 34 is a module that manages a memory and an external storage device. Main functions of the memory management module 34 include performing allocation and/or deallocation of the memory and/or the external storage device based on a request from another module. Here, the memory is mainly the RAM 26.

The print management module 35 is a module that performs control regarding print processing of image data, which is generated by the PDL analyzing module 31. The print management module 35 performs various processes that may be required for causing the printer engine 13 to print image data stored in the memory and/or the external storage device, which are managed by the memory management module 34. For example, the print management module 35 issues a paper feed command and a paper eject command; issues a post-processing execution command; detects an error state regarding printing; and transmits information to another module.

The system management module 36 is a module that manages and/or controls device configuration information and an apparatus state of the image forming apparatus 100. The device configuration information is information such as information regarding whether the paper feed tray is attached to the image forming apparatus 100; information regarding whether the paper eject tray is attached to the image forming apparatus 100; or information regarding a type of a paper sheet in the paper feed tray. The apparatus state is a state of the image forming apparatus 100 such as a printing state; a waiting state; or an error state (e.g., paper jamming or out of paper). Main functions of the system management module 36 include transmitting such information to another module, and management of the settings of the image forming apparatus 100 by the user. Here, the settings of the image forming apparatus 100 means setting of items that can be customized. The setting of each of the items causes the corresponding operation of the image forming apparatus 100 to be changed.

The operations panel management module 37 is a module that receives a display request of the operations panel 11 and a panel operation by a user. Main functions of the operations panel management module 37 include displaying a state of the image forming apparatus 100 or a menu screen of the image forming apparatus 100 on the operations panel 11 based on a request from another module; changing the setting of the image forming apparatus 100, which is managed by the system management module 36, and reflecting the change of the setting in the operations panel 11; and displaying an error screen and prompting a user to take a proper action. Further, when the operations panel management module 37 displays a button on the menu screen or on the error screen, the operations panel management module 37 recognizes the pressed button, and the operations panel management module 37 transmits information regarding the pressed button to another module. Further, in some of the following examples, the operations panel management module 37 has a function to periodically confirm whether the operations panel 11, on which Android OS is installed, is normally activated.

An Example

A user operates the operations panel 11 to print a document or to copy a document. Here, examples of the printing of the document by the operation on the operation panel 11 include printing of accumulated documents and printing of document data stored in a portable storage medium.

It is possible that the user presses a start key to start printing while a printing condition is erroneously set, and subsequently the operations panel 11 abends. The image forming apparatus 100 according to the embodiment can suppress wasting of paper sheets in such a case.

The operations panel management module 37 and the job management module 32 are two modules that detect an abend of the operations panel 11 and that execute a substantial task for interrupting a print job.

<Operation Mode>

In this example, the print job is interrupted by using the following two points. The first point is that the process, by the PDL analyzing module 31, of converting the print data into the image data is controlled by the job management module 32. The second point is that the process, by the print management module 35, of reading the image data and the control information from the memory and causing the printer engine 13 to print the image data is controlled by the job management module 32. An operation mode of the image forming apparatus 100 in which the job management module 32 is not interrupting a print job is referred to as a "normal mode." An operation mode of the image forming apparatus 100 in which the job management module 32 is interrupting a print job is referred to as a "print pause mode." The print pause mode is displayed on the operations panel 11. An operation mode of the image forming apparatus 100 immediately after activation of the image forming apparatus 100 is the normal mode. The normal mode is the default operation mode.

A print job is processed in a flow of (i) expanding image data which is received by the PDL analyzing module 31 into image data, and generating control information; and (ii) printing, by the print management module 35, the image data based on the control information.

The normal mode is a mode where a print job is smoothly processed in the order of (i) and (ii). The print pause mode is a mode where the process of (i) is executed, but the print job is interrupted without executing the process of (ii).

When the operation mode of the image forming apparatus 100 is switched to the print pause mode during execution of a print job, the job management module 32 interrupts printing (or feeding or outputting of a paper sheet) at a time at which the operation mode is switched to the print pause mode, even if either one of the process (i) or the process (ii) is being executed. When a paper sheet is already fed, the image forming apparatus 100 ejects that paper sheet. However, the image forming apparatus 100 does not feed the next paper sheet, and the image forming apparatus 100 is paused.

Since the print pause mode is an operation mode of the entire image forming apparatus 100, the print pause mode can be applied to all print jobs including a print job, for which the host computer transmits a print request.

<Operations Panel Management Module>

First, a process which is executed by the operations panel management module 37 is explained. The operations panel management module 37 is always monitoring a state of the operations panel 11.

Figure 5:
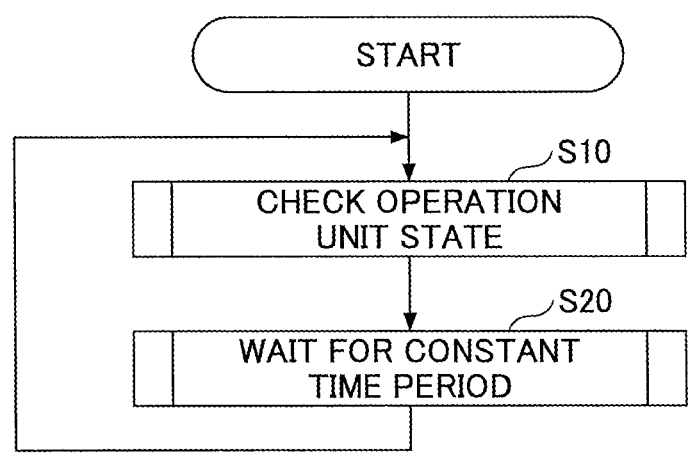
FIG. 5 is an example of a flowchart showing a procedure of processing by an operations panel management module.

FIG. 5 is a flowchart showing an example of a procedure of processing by the operations panel management module 37. As shown in FIG. 5, the operations panel management module 37 periodically checks a state of an operations unit (S10). The operation unit state is explained later by referring to FIG. 6.

After checking, the operations panel management module 37 waits until a predetermined time period is elapsed (S20), and the operations panel management module 37 repeats checking of the operations unit.

There is no particular restriction for the time period for waiting (which is a period of checking the operation unit state) at step S20. However, if the time period for waiting is too short, the processing load is increased, and the image forming apparatus 100 becomes inefficient. If the time period is too long, timing for detecting an abend of the operations panel 11 is delayed, and it is possible that documents are output. Thus, the time period for waiting can be set to be within a range from several tens of milliseconds to several seconds. In this example, the time period can be set to be one second, for example.

Figure 6:
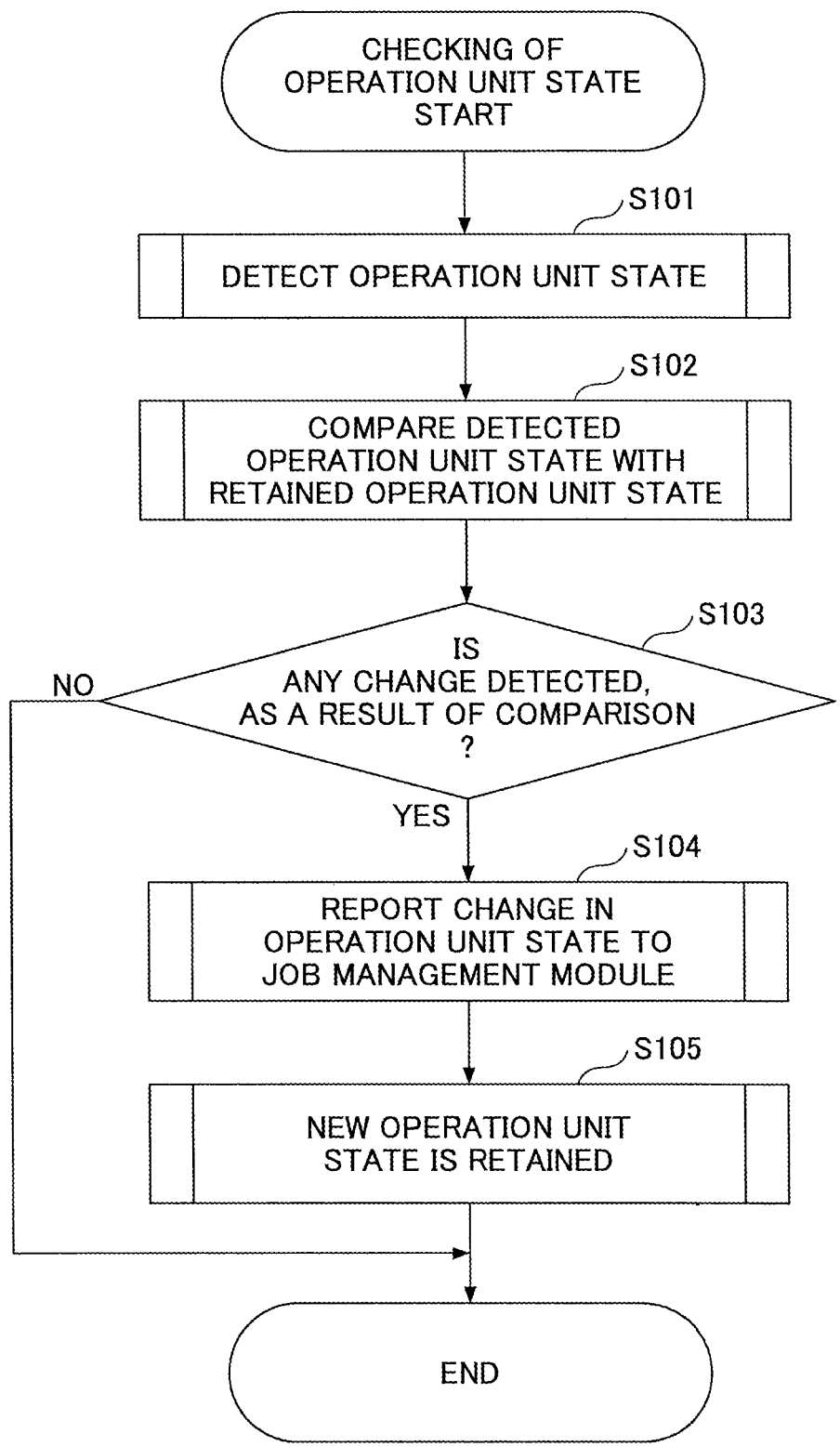
FIG. 6 is an example of a flowchart showing a procedure of checking an operation unit state of step S10 of FIG. 5.

FIG. 6 is a flowchart showing an example of a procedure of processing of "checking the operation unit state" at step S10 of FIG. 5. The processing of FIG. 6 is such that an operation unit state is recorded, and a change in the operation unit state is detected.

In this example, an operation unit state means an operation state of the operations panel 11. An operation unit state can be one of an activated state and a downed state. The activated state means a state where the operations panel 11 is operating normally. The downed state means a state where the operations panel 11 is not normally operating. For example, the operations panel management module 37 may transmit a signal to the operations panel 11, and the operations panel management module 37 may confirm the operation unit state based on whether a response to the transmitted signal is received or not. Alternatively and/or additionally, the operations panel management module 37 may execute a function of Android OS, and the operations panel management module 37 may confirm that the operation unit state is the activated state when the connection to the operations panel management module 37 is re-established. Alternatively and/or additionally, the operations panel management module 37 may confirm that the operation unit state is the activated state by monitoring a process which is executed by Android OS when Android OS is activated, or by monitoring a process which is periodically executed by Android OS (e.g., a process of inverting a flag).

The operation unit state immediately after activation of the image forming apparatus 100, which is one of the activated state and the downed state, is retained in advance by the operations panel management module 37. For example, an initial state of the operation unit state may be set to be the downed state, and the operation unit state may be detected to be the activated state when the operations panel management module 37 confirms that the operations panel 11 is activated. Since the operation unit state is not changed until the operations panel 11 is activated, an operation unit state report is not transmitted to the job management module 32 until the operations panel 11 is activated.

First, the operations panel management module 37 detects the operation unit state in the above-described manner (S101).

Subsequently, the operations panel management module 37 compares the current detected operation unit state with the retained operation unit state (S102).

When the operation unit state is not changed (S103: NO), the procedure of FIG. 6 is terminated.

When the operation unit state is changed (S103: YES), the operations panel management module 37 reports to the job management module 32 that the operation unit state is updated (S104). This report is referred to as the "operation unit state report."

The operations panel management module 37 overwrites and saves the detected operation unit state as the current operation unit state in the RAM 26, for example. There are two types of the operation unit state report to the job management module 32, namely, an "operation unit down report" and an "operation unit recovery report." The "operation unit down report" is reported when the operation state of the operations panel 11 is changed from the activated state to the downed state. The "operation unit recovery report" is reported when the operation state of the operations panel 11 is changed from the downed state to the activated state.

<Job Management Module>

Next, processes of the job management module 32 are explained. The job management module 32 receives an operation unit state report from the operations panel management module 37, and the job management module 32 controls interruption/restart of a print job.

Figure 7:
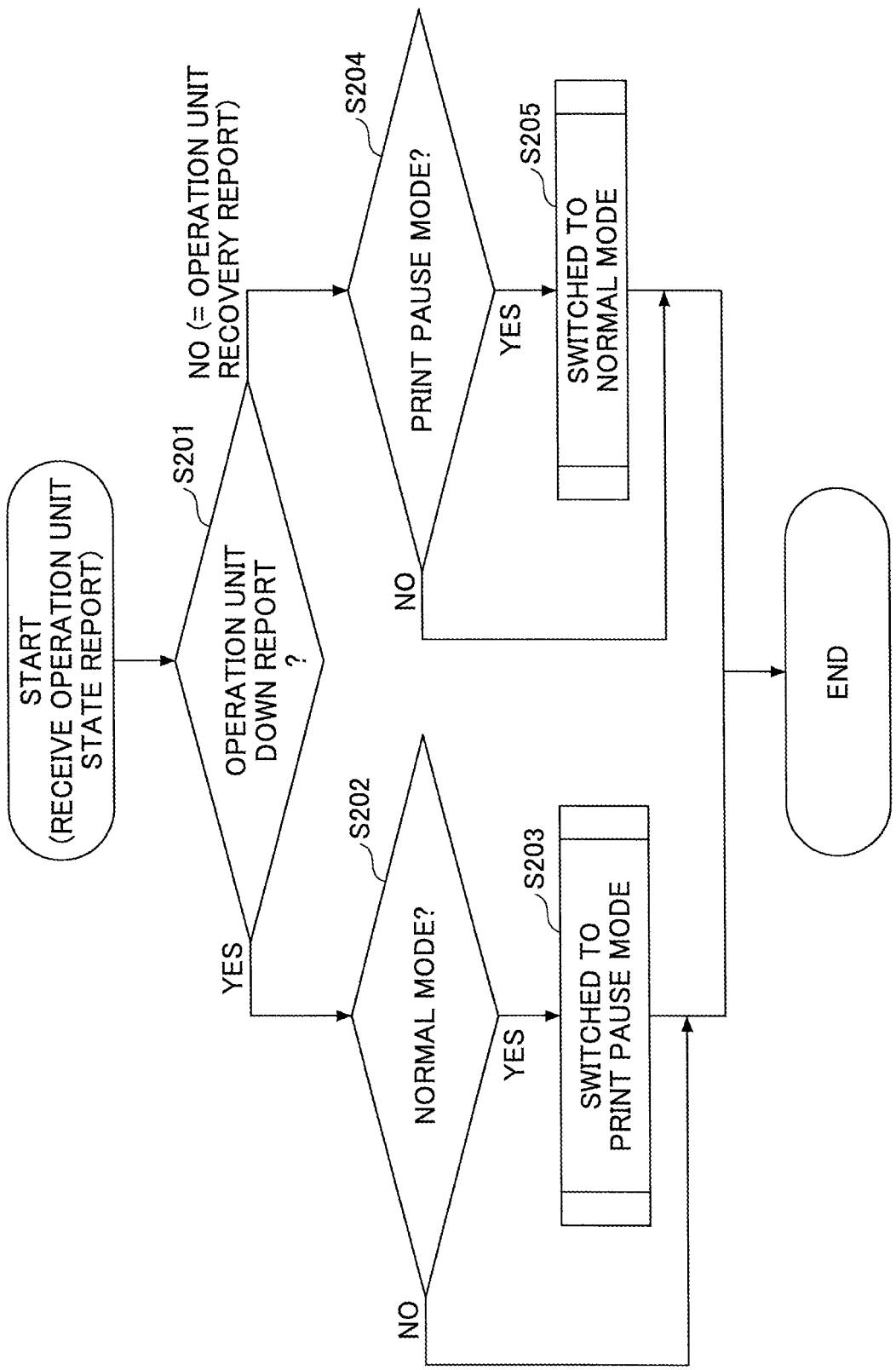
FIG. 7 is a flowchart of an example of a procedure when a job management module receives an operation unit state report.

FIG. 7 is a flowchart of an example of a procedure of the job management module 32, when the jot management module 32 receives an operation unit state report.

When the job management module 32 receives an operation unit state report, the job management module 32 determines whether the content of the report is an "operation unit down report or an "operation unit recovery report" (S201).

When the operation unit state report is the operation unit down report (S201: YES), the job management module 32 determines whether an operation mode of the image forming apparatus 100 is a normal mode (S202). When the operation mode is the normal mode, the job management module 32 causes the operation mode of the image forming apparatus 100 to be switched to a print pause mode (S203). When the operation mode is not the normal mode, since the operation mode is already the print pause mode, the job management module 32 does not cause the operation mode to be switched.

When the operation unit state report is the operation unit recovery report (S201: NO), the job management module 32 determines whether the operation mode of the image forming apparatus 100 is the print pause mode (S204). When the operation mode is the print pause mode, the job management module 32 causes the operation mode to be switched to the normal operation mode after a predetermined time period is elapsed (S205). In this manner, the print job is automatically restarted.

Figure 8:
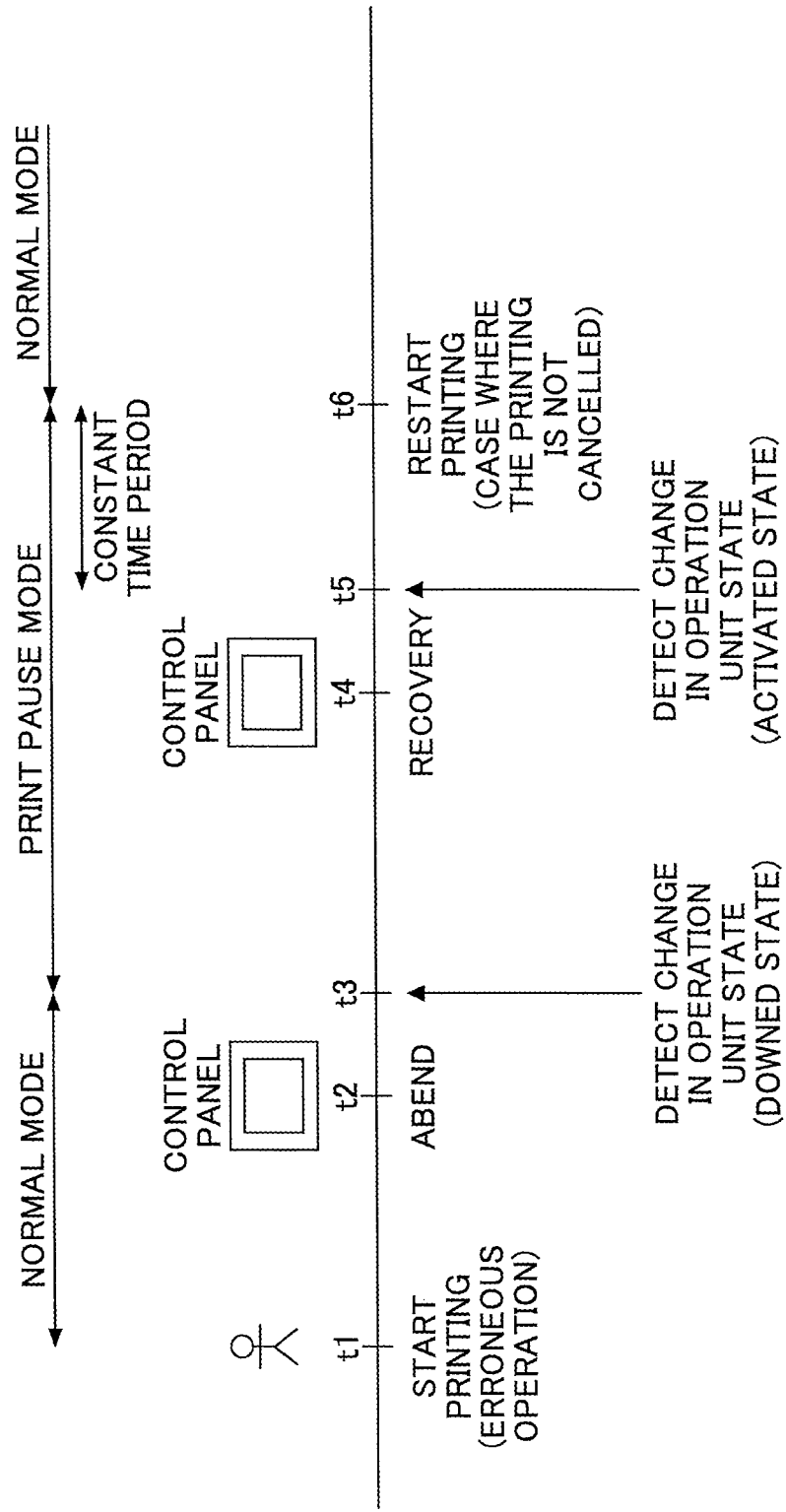
FIG. 8 is an example of a diagram illustrating a process from an abend of the operations panel to recovery to a normal mode.

Here, there is explained the reason why the job management module 32 waits for the predetermined time period prior to the switching of the operation mode. FIG. 8 is a diagram illustrating the progress from the abend of the operations panel 11 to the recovery to the normal mode. A user operates the operations panel 11 and causes the image forming apparatus 100 to start printing at time t1. Even if the printing condition which is set by the user is correct, it is possible that an unnecessary paper sheet is output by the abend of the operations panel 11. Alternatively, for example, it is possible that the setting of an aggregate printing or a setting of density is erroneously made.

Since the operation mode of the image forming apparatus 100 immediately after activation of the image forming apparatus 100 is the normal mode, the job management module 32 continuously performs the above-described processes (i) and (ii) by using the PDL analyzing module 31 and the service providing module group 38. The operations panel 11 abends at time t2. After a time interval for the operations panel management module 37 to check the operation unit state is elapsed, the operations panel management module 37 detects a change in the operation unit state, and the operations panel management module 37 transmits the operation unit state report (the operation unit down report) to the job management module 32. The job management module 32 causes the operation mode to be switched to the print pause mode, thereby interrupting the print job. The operations panel 11 is recovered at time t4. After a time interval for the operations panel management module 37 to check the operation unit state is elapsed, the operations panel management module 37 detects a change in the operation unit state at t5, and the operations panel management module 37 transmits the operation unit state report (the operation unit recovery report) to the job management module 32. The job management module 32 waits for the predetermined time period prior to causing the operation mode to be switched to the normal mode. That is because if the operation mode is switched to the normal mode immediately after the recovery of the operations panel 11, the job management module 32 restarts printing, and it is possible that an unnecessary paper sheet is output until the user cancels the printing. As shown in FIG. 8, for the case where the job management module 32 waits for the predetermined time period, the user may cancel the print job by operating the operations panel 11.

The predetermined time period until the switching to the normal mode may be a sufficient time period for the user to cancel the printing after the recovery of the operations panel 11. In the embodiment, for example, the predetermined time period is set to be ten seconds. After the predetermined time period is elapsed, the job management module 32 causes the operation mode to be switched to the normal mode. With this, the print jot is restarted, if the user does not cancel the printing. Namely, the printing is automatically restarted without any special operation by the user.

As explained above, the image forming apparatus 100 according to the embodiment can detect an abend of the operations panel 11 and automatically interrupt printing, even if the user does not cancel the printing immediately, because of the abend of the operations panel 11. Accordingly, it is possible to suppress outputting of a print job, where the user wishes to cancel the printing of the print job. The user may cancel the printing of the interrupted print job after the operations panel 11 is recovered. By doing this, the print job is deleted. Additionally, since the printing is automatically restarted, for example, ten seconds after the recovery of the operations panel 11, manual restart of the printing by the user may not be required. Furthermore, a state may be prevented where the printing is stopped and the printing is not restarted for a long time.

Another Example

In the above-described example, the change in the operation unit state (the activated state or the downed state) is detected by always monitoring the state of the operations panel 11 by the operations panel management module 37. Hereinafter, there is explained another example where the operations panel 11 actively reports a change in the operation unit state to the controller 12 in the image forming apparatus 100.

Figure 9:
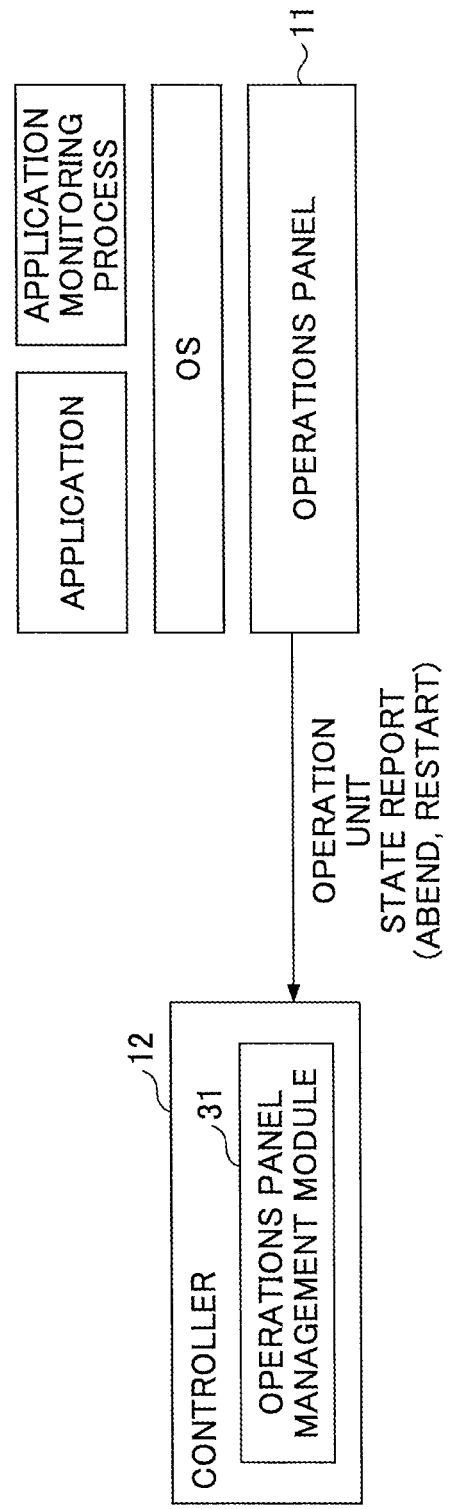
FIG. 9 is an example of a schematic configuration diagram of the operations panel and a controller.

FIG. 9 is a schematic configuration diagram illustrating an example of schematic configurations of the operations panel 11 and the controller 12. Android OS (the term "Android" is abbreviated in the figure) operates on the operations panel 11. An Android application (the term "Android is abbreviated in the figure) and an application monitoring process are executed on Android OS. There may be many types of Android applications. For example, a printer application of the image forming apparatus 100 and a software development kit (SDK) application may be considered as examples of the Android application.

The application monitoring process is a process for monitoring states of corresponding applications. The application monitoring process detects an abend of an Android application, for example, from presence or absence of an acknowledgement. When an Android application abends as a single element, the application monitoring process reports the abend to the controller 12. Similarly, the application monitoring process detects restarting of the Android application, and the application monitoring process reports the restarting of the Android application to the controller 12. In this example, these reports (of the abend and the restart) are the operation unit state reports.

In the controller 12, the operations panel management module 37 receives an operation unit state report from the operations panel 11, and the operations panel management module 37 reports the operation unit state report to the job management module 32 as it is. Namely, the operations panel management module 37 does not actively determine an abend of the operations panel 11. Instead, the operations panel management module 37 relays an operation unit state report. The processing by the job management module 32 is the same as that of the above-described example.

Figure 10:
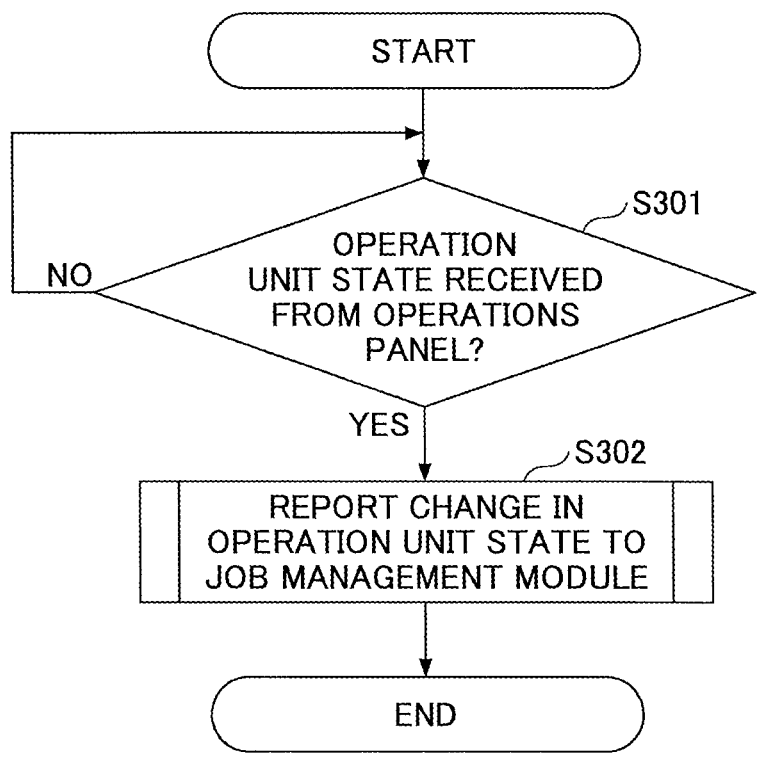
FIG. 10 is a flowchart showing a procedure of the operations panel management module according to another example.

FIG. 10 is a flowchart showing a procedure of the operations panel management module 37 according to this example.

The operations panel management module 37 determines whether the operation unit state report is received from the operations panel 11 (S301). When the operations panel management module 37 does not receive the operation unit state report (S301: NO), the operations panel management module 37 may wait just as it is. Alternatively, the operations panel management module 37 may terminate the processing of FIG. 10, and the operations panel management module 37 may periodically perform the processing of FIG. 10.

When the operations panel management module 37 receives the operation unit state report (S301: YES), the operations panel management module 37 reports a change in the operation unit state to the job management module 32 (S302).

When the operation unit state report is the report of the abend, the job management module 32 causes the operation mode to be switched from the normal mode to the print pause mode. When the operation unit state report is the report of the restart, the job management module 32 causes the operation mode to be switched from the print pause mode to the normal mode, after waiting for the constant time period.

In the image forming apparatus 100 in this example, since it is possible to interrupt or restart the print job after waiting for the operation unit state report from the operations panel 11 similar to the above-described example, the processing load on the controller 12 may be reduced.

The above-described example and this example are not mutually exclusive. Both the above-described example and this example may be applied to the image forming apparatus 100.

Another Example

In the former of the above-described examples, it is assumed that the user directly operates the operations panel 11 (the user stays in front of the operations panel 11). However, the user is not always staying in front of the operations panel 11. For a case where the user uses the image forming apparatus 100 as a printer, it is possible that a print request is transmitted from the host computer 200, such as the PC, through a network. Hereinafter, this mode of the operation is referred to as a "remote operation," and the mode of the operation where the operation panel 11 is directly operated is referred to as a "local operation." In many cases, the user may not stay in front of the operations panel 11.

For a case where the user does not stay in front of the operations panel 11, there are few advantages for the user to interrupt the printing when the operations panel 11 abends, contrary to the former of the above-described examples. For the user who wants to print (who does not want to cancel), there may be a disadvantage that the time to complete the printing is lengthened.

Hereinafter, another example is explained where the image forming apparatus 100 switches the control on a print job-by-print job basis, depending on whether a request of a print job is made by the remote operation or by the local operation of the operations panel (e.g., reprinting of the accumulated documents or printing of data stored in a portable storage medium).

A determination of a requesting source of the print job is made based on whether the network management module 33 receives the print data or the operations panel management module 37 receives a printing operation from the operations panel 11. In this example, it is assumed that the job management module 32 determines this and the job management module 32 sets an attribute (the remote operation or the local operation) which indicates the request source to the print job.

For a case where a print job is requested by the remote operation (i.e., the request source is a remote source), the likelihood that the user stays in front of the operations panel 11 is low. Accordingly, the job management module 32 does not interrupt the printing, even if the operation panel 11 is in the downed state, and the job management module 32 continues the printing. For a case where the print job is requested by the local operation on the operations panel 11 (i.e., the request source is a local source), since the likelihood that the user stays in front of the operations panel 11 is high, the job management module 32 interrupts the printing.

Thus, the job management module 32 interrupts printing during the downed state of the operations panel 11, only if the print job is requested by the local operation on the operations panel 11 (only if the requested source is the local source).

In order to embody this control, when the job management module 32 receives the operation unit state report (the operation unit down report), the job management module 32 determines whether there is a local print job. When there the local print job exists, the job management module 32 only interrupts the local print job. Further, when the job management module 32 receives the operation unit recovery report, the job management module 32 determines whether there is an interrupted local print job. When the interrupted local print job exists, the job management module 32 restarts the interrupted local print job.

In this manner, the remote print job which is requested by the host computer 200 is processed without being effected by the operation unit state, and thereby an increase in waiting time of the remote user may be suppressed.

FIG. 11 is a diagram showing an example of a job list which is displayed on the operations panel 11. In the job list, the "attribute ("o" means local)" which indicates the request source of the corresponding print job, the "ID," the "name," the "user name," the "user ID," the "document name," the "state," the "date and time of creation," and the "number of pages" of the job are registered for each of the print jobs. The job management module 32 can determine a request source of the print job by reading the "attribute," and the job management module 32 can determine whether the printing is interrupted or the printing is completed by reading the "state."

Figure 12:
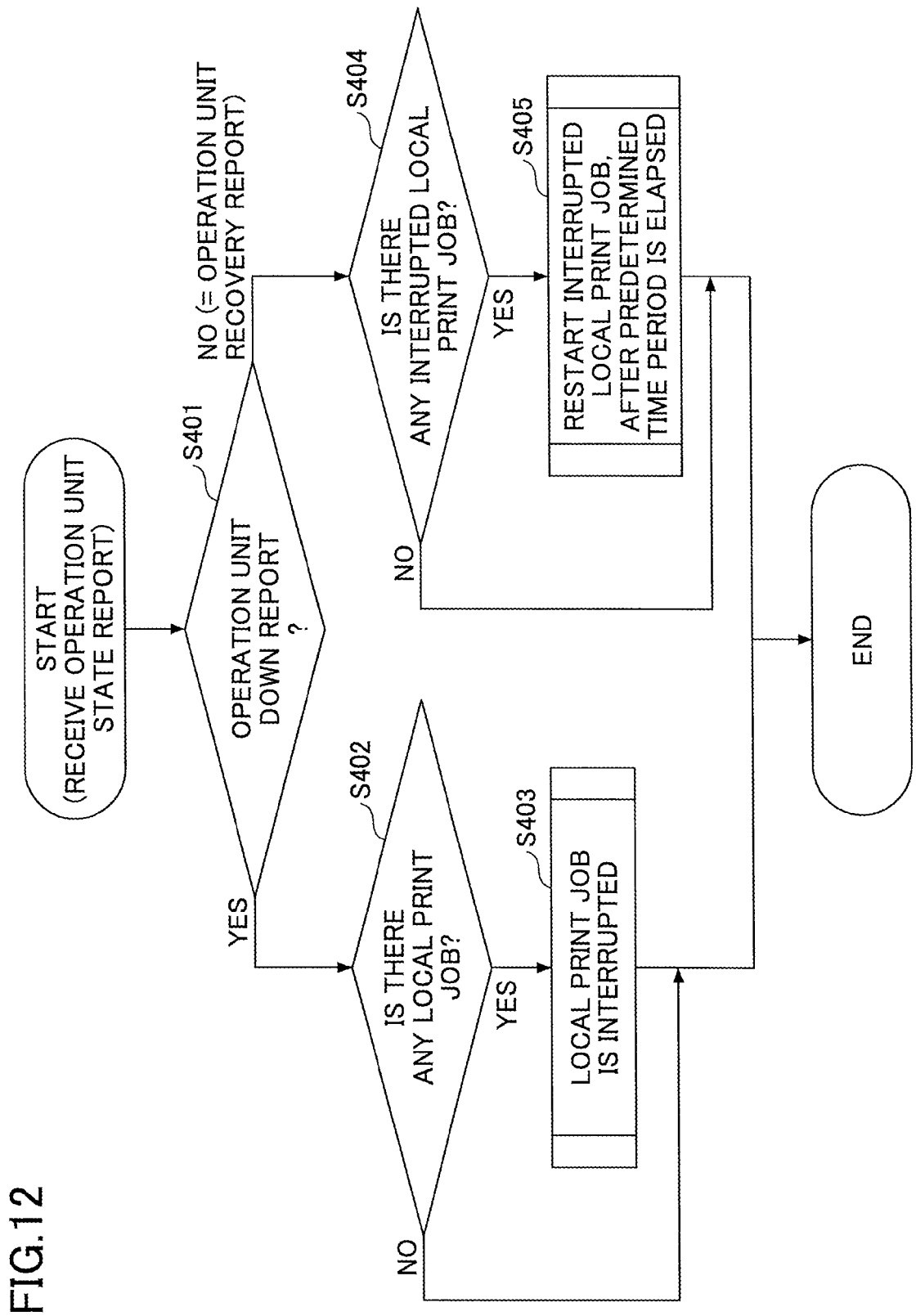
FIG. 12 is a flowchart of an example of the procedure of the job management module, when the job management module receives the operation unit state report.

FIG. 12 is a flowchart showing an example of a procedure of the job management module 32 in this example, when the job management module 32 receives the operation unit state report.

When the job management module 32 receives an operation unit state report, the job management module 32 determines whether the contents of the report are the "operation unit down report" or the "operation unit recovery repot" (S401).

When the operation unit state report is the operation unit down report (S401: YES), the job management module 32 determines whether a local print job exists (S402). When a local print jot exists, the job management module 32 only interrupts the local print job (S403).

When the operation unit state report is the operation unit recovery report (S401: NO), the job management module 32 determines whether an interrupted local print job exists (S404). When an interrupted local print job exists (S404: YES), the job management unit 32 restarts the interrupted local print job after the predetermined time period is elapsed (S405).

As described above, in this example, the image forming apparatus 100 only interrupts the local print job. Accordingly, for a case where the operations panel 11 abends during execution of a print job which is requested from the host computer 200, the printing of the remote print job can be continued without interrupting the remote print job. Thus, the user who requests the printing from the host computer 200 may not be forced to wait for a long time until the completion of the printing.

Another Example

Cases are increasing where a user performs printing from a mobile terminal such as a smart phone (hereinafter, such printing is referred to as "mobile printing"). There are no clear definitions for such a mobile terminal. However, examples of such a mobile terminal include a tablet computer, a cellular telephone, and a PDA, in addition to the smart phone. There are many cases where Android OS is installed in a smart phone, similar to the case of the operations panel 11. Accordingly, it is possible that a mobile terminal abends at an unexpected timing or a battery runs out at an unexpected timing. Further, there is an example of the mobile printing where, in addition to a print request, cancellation of printing can be requested from a user interface (UI) of a mobile terminal.

In the above-described examples, the operation unit state of the operations panel 11 (which is a part of the image forming apparatus 100) is considered. For a case where a print request is transmitted from a mobile terminal, a situation may be considered where the mobile terminal abends immediately after transmitting the print request, and consequently an unnecessary paper sheet is printed, since it is not possible to cancel the printing from the mobile terminal.

Thus, in this example, there is explained the image forming apparatus 100 such that, when a state of a mobile terminal (which is a request source terminal) becomes the downed state during mobile printing, the image forming apparatus 100 interrupts the print job which is requested by the mobile terminal.

During mobile printing, the job management module 32 monitors a state of the mobile terminal, which is the request source terminal. During the mobile printing (which is from inputting of data to completion of ejecting a paper sheet), a state is such that a communication connection is established between the image forming apparatus 100 and the mobile terminal. Accordingly, when the communication connection is disconnected, the job management module 32 determines that the request source terminal is in the downed state.

The state where the communication connection is established is a state where the image forming apparatus 10 and the mobile terminal can communicate with each other. First, the image forming apparatus 100 and the mobile terminal establish a connection, for example, by the three-way handshake which is performed by the TCP protocol (which is sometimes referred to as a communication connection in a limited sense). After that, at an application layer which is a layer above the TCP, a communication may be performed properly by using the TCP connection. In this example, there is no restriction on the communication protocol of the application. Detection is made as to whether the communication connection is disconnected by determining whether the application of the image forming apparatus 100 can communicate with the mobile terminal.

Figure 13:
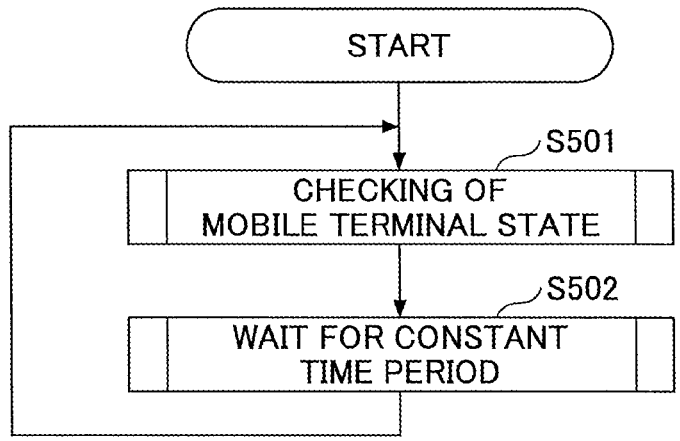
FIG. 13 is a flowchart of an example case where the job management module monitors a state of a mobile terminal.

FIG. 13 is a flowchart of an example case where the job management module 32 monitors a state of the mobile terminal. During the mobile printing, the job management module 32 checks a state of the mobile terminal (S501). Since the state of the mobile terminal is a state where the communication with the mobile terminal is connected or a state where the communication with the mobile terminal is disconnected, it suffices if it is confirmed whether a response is returned or not.

After the checking of the state of the mobile terminal, the job management module 32 waits for the predetermined time period (S502), and the job management module 32 repeats checking as to whether the communication connection is established. In this manner, the job management module 32 always or periodically checks the state of the mobile terminal. Here, the predetermined time period is the same as that of the first one of the above-described examples.

Figure 14:
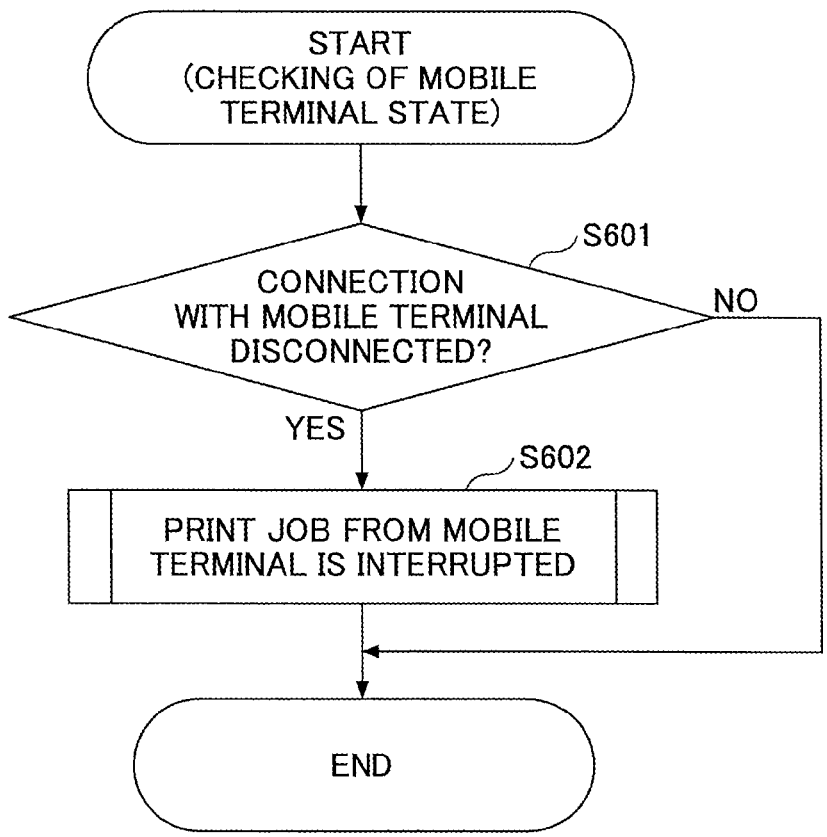
FIG. 14 is an example of a flowchart showing a procedure of the job management module after checking a mobile terminal state.

FIG. 14 is a flowchart showing an example of a procedure of the job management module 32 after checking the state of the mobile terminal.

When the connection with the mobile terminal is disconnected (S601: YES), the job management module 32 interrupts a print job which is requested by the mobile terminal (S602).

After that, printing of the interrupted print job may be cancelled or restarted by operating the operations panel 11 of the image forming apparatus 100 by the user. Additionally, when the user inputs an IP address of the image forming apparatus 100 to a browser which operates on the host computer 200, the host computer 200 can communicate with the image forming apparatus 100. Since the image forming apparatus 100 includes a function of providing a state of the image forming apparatus 100 itself, for example, by an HTML and a function of receiving an operation through the browser, the user can cause the image forming apparatus to cancel or restart the printing by using the host computer 200.

In this example, similar to the cases of the above-described examples, the interrupted print job can be restarted after the predetermined time period is elapsed from the detection of the recovery of the communication connection. A session ID (cookie) may be used for a method, by the image forming apparatus 100, of identifying the mobile terminal that requests the print job after the communication connection is disconnected. The job management module 32 manages the print job together with the session ID. When a session ID transmitted from a connected mobile terminal is the same as the session ID which is included in the interrupted print job, the job management module 32 accepts a command with respect to the print job. In this manner, the user of the mobile terminal can delete or restart the interrupted print job without operating the operations panel 11. Thus, in this example, even if the mobile terminal requests a print job and subsequently the mobile terminal abends, the image forming apparatus 100 can interrupt the print job. During the interruption, the user can terminate the print job. Additionally, when the mobile terminal establishes the connection with the image forming apparatus 100 again, the user can delete or restart the print job.

Another Example

Another example is explained such that, in the above-described examples, the image forming apparatus 100 records an error log. In the above-described examples, the print job is interrupted when the operations panel 11 of the image forming apparatus 100 abends or when the mobile terminal, which is the requested source, abends. In the first one and the second one of the above-described examples, the operation mode of the image forming apparatus 100 becomes a print pause mode when the operation panel 11 abends. Since the operation mode of the image forming apparatus 100 becomes the print pause mode, the print job is interrupted irrespective of whether the operation is the local operation or the remote operation. In the third one of the above-described examples, when the operations panel 11 (which is actually operated) abends, only a local print job is interrupted. In the fourth one of the above-described example, when the mobile terminal abends, only a print job by the mobile terminal is interrupted.

Accordingly, in the first, second, and fourth ones of the above-described examples, it is possible that the user who requests printing by the remote operation may not be aware of a cause of a delay until the completion of the printing.

When an error log is recorded in the image forming apparatus 100, the user who operates the image forming apparatus 100 by the remote operation may be aware of the reason why the printing is not completed and the reason why it takes such a long time to complete the printing by receiving the error log from the image forming apparatus 100. Further, it is effective to record that the operations panel 11 abends even for the third one of the above-described examples.

FIG. 15 is a diagram showing an example of the error log. For example, contents of the error log are such that the "contents of the error" and "the error occurrence time" are added to the job list. The user who operates the image forming apparatus 100 by the remote operation may deduce that the print job which is requested by the user is not completed based on the error occurrence time.

Figure 16:
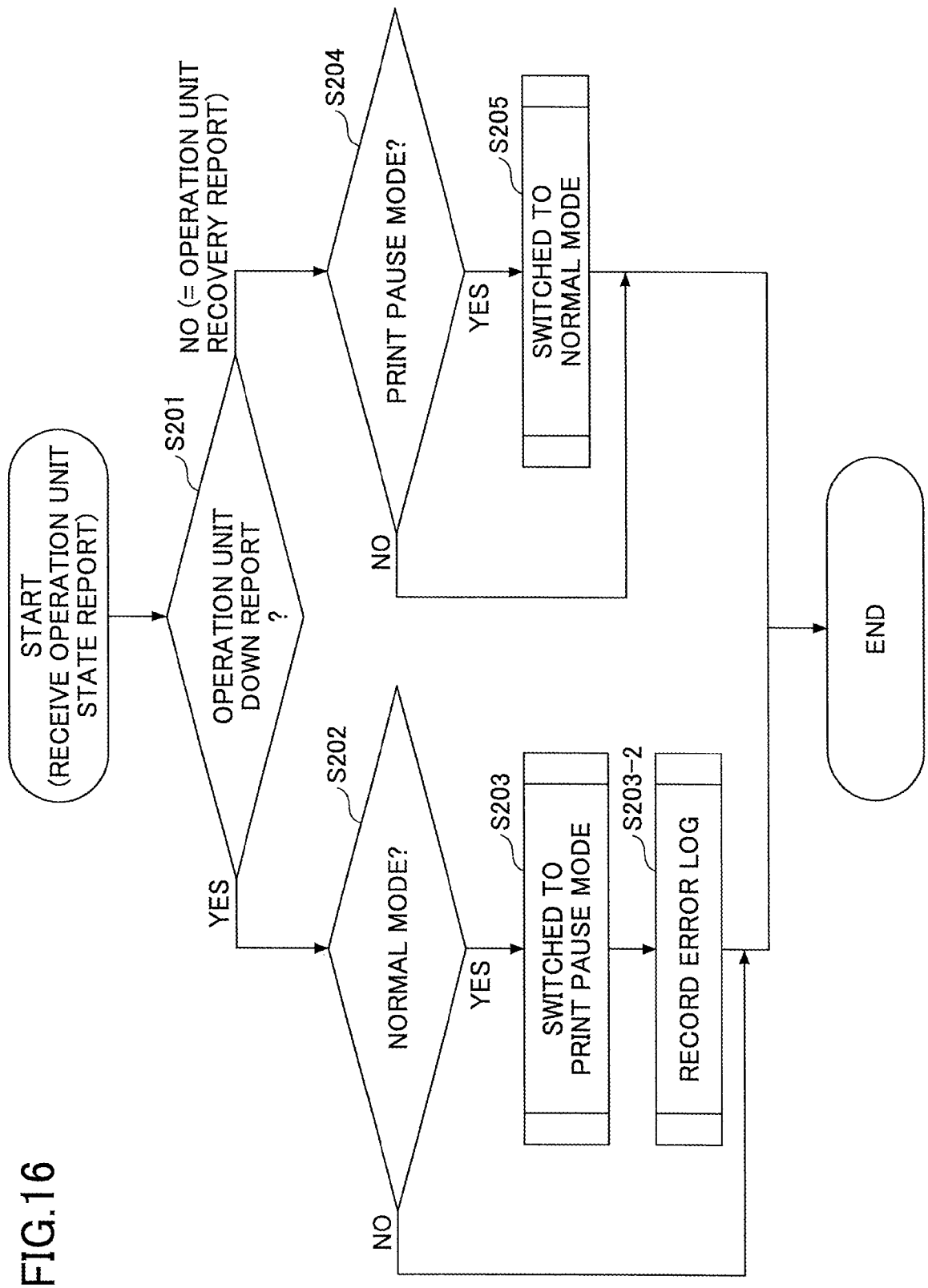
FIG. 16 is an example of a flowchart showing a procedure of the job management module for checking the operation unit state report.
Figure 17:
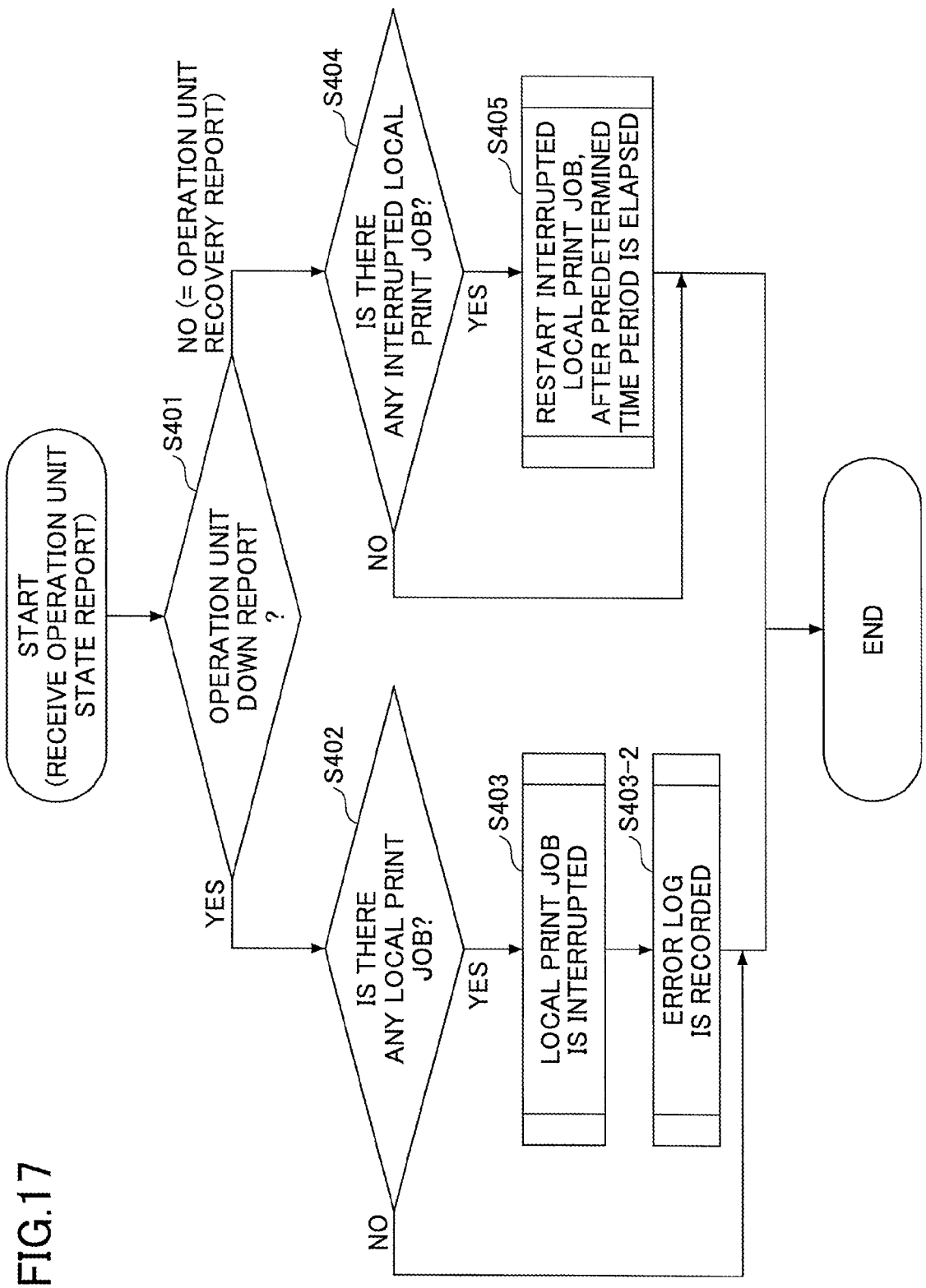
FIG. 17 is an example of a procedure of the job management module for checking the operation unit state report.
Figure 18:
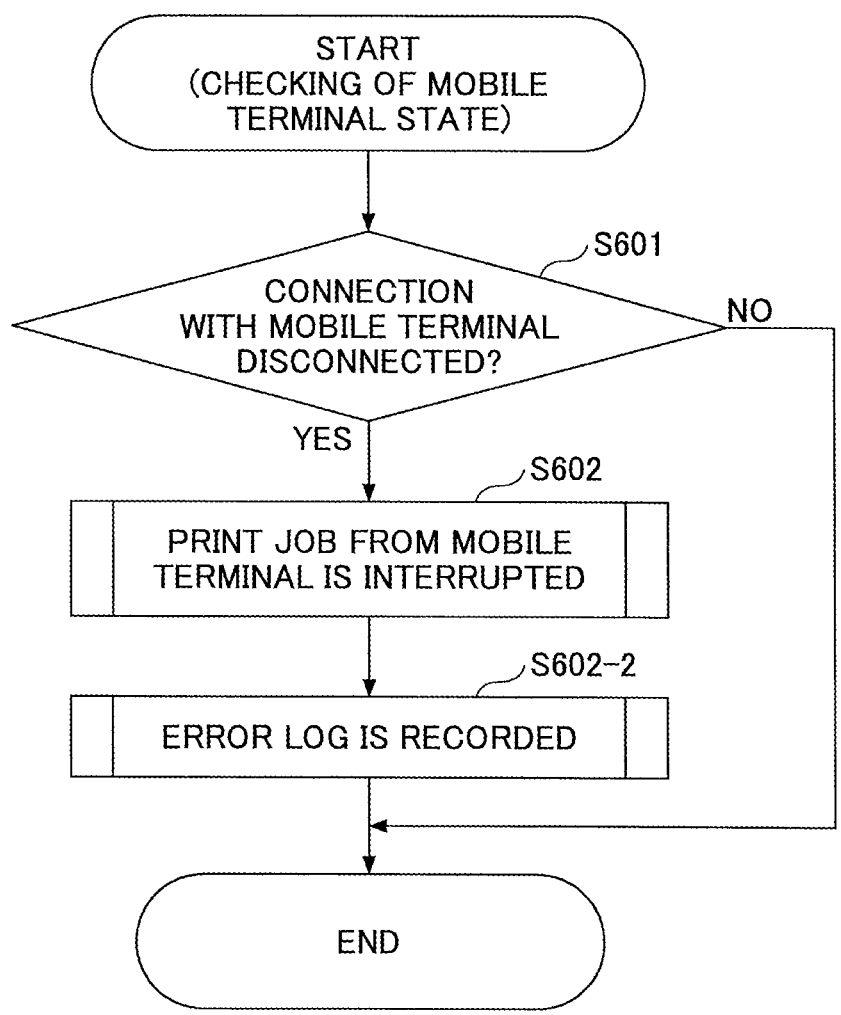
FIG. 18 is an example of a procedure of the job management module for checking the operation unit state report.

FIGS. 16-18 are flowcharts showing examples of procedures of the job management module 32, when the job management module 32 checks the operation unit state report or the mobile terminal state.

FIG. 16 is the flowchart corresponding to the first and second ones of the above-described examples. A step (step S203-2), by the job management module 32, of recording the error log is added after step S203.

FIG. 17 is the flowchart corresponding to the third one of the above-described examples. A step (S403-2), by the job management module 32, of recording the error log is added after step S403.

FIG. 18 is the flowchart corresponding to the fourth one of the above-described examples. A step (S602-2), by the job management module 32, of recording the error log is added after step S602.

In this manner, by recording the error log, the user who operates the image forming apparatus 100 by the remote operation may be aware of the reason why it takes such a long time to complete the printing.

Hereinabove, the image forming apparatus and the print system are explained by the embodiment. However, the present invention is not limited to the specifically disclosed embodiment, and variations and modifications may be made without departing from the scope of the present invention. Additionally, the modifications are included in the scope of the invention.

The present application is based on Japanese Priority Application No. 2012-122231 filed on May 29, 2012, the entire contents of which are hereby incorporated herein by reference.

What is claimed is:

1. An image forming apparatus comprising:
   a command receiving unit configured to receive a first print command, wherein the first print command is input through an operation unit that is configured to receive a user's operation; and the operation unit is configured to be controlled by an operating system that is different from an operating system of the image forming apparatus; and
   a controller configured to,
      store a first state,
      detect a current state of the operation unit, and
      generate a comparison result based on the current state of the operation unit and the stored first state,
   wherein the controller is configured such that, in response to the comparison result indicating that the current state of the operation unit is a predetermined state subsequent to receiving the first print command by the command receiving unit and prior to completion of first printing based on the first print command, the controller causes the first printing based on the first print command received by the command receiving unit to be terminated, and
   wherein the controller is configured such that, in response to the comparison result indicating that the current state of the operation unit is not the predetermined state subsequent to receiving the first print command by the command receiving unit and prior to the completion of the first printing based on the first print command, the controller causes the first printing based on the first print command received by the command receiving unit to be executed.

2. The image forming apparatus according to claim 1, wherein, when the controller causes the first printing based on the first print command received by the command receiving unit to be terminated and subsequently detects that the current state of the operation unit is not the predetermined state, the controller subsequently causes the first printing to be restarted.

3. The image forming apparatus according to claim 1, further comprising:
   a receiver configured to receive a second print command from an information processing device,
   wherein, when the controller detects that the current state of the operation unit is the predetermined state subsequent to receiving the second print command by the receiver and prior to completion of second printing based on the second print command, the controller causes the first printing based on the first print command received by the command receiving unit to be terminated, and the controller causes the second printing based on the second print command received by the receiver to be executed, and
   wherein, when the controller detects that the current state of the operation unit is not the predetermined state subsequent to causing the first printing based on the first print command received by the command receiving unit to be terminated, the controller subsequently causes the first printing to be restarted.

4. The image forming apparatus according to claim 3,
wherein the controller is configured to detect a state of the information processing device,
wherein, when the controller detects that the state of the information processing device is the predetermined state subsequent to receiving the second print command from the information processing device by the receiver and prior to the completion of the second printing, the controller causes the second printing based on the second print command received by the receiver to be terminated, and
wherein, when the controller detects that the state of the information processing device is not the predetermined state subsequent to receiving the second print command from the information processing device by the receiver and prior to the completion of the second printing, the controller causes the second printing based on the second print command received by the receiver to be executed.

5. The image forming apparatus according to claim 1,
wherein the controller causes the first printing to be restarted subsequent to elapsing a predetermined time period from a moment at which the controller causes the first printing based on the first print command received by the command receiving unit to be terminated.

6. The image forming apparatus according to claim 1,
wherein, when the controller causes the first printing to be terminated, the controller records a log for identifying the first print command for the first printing which is to be terminated.

7. The image forming apparatus according to claim 1,
wherein the predetermined state is a first state or a second state, wherein the first state is such that, when a signal is transmitted to the operation unit, no responses are received from the operation unit, and the second state is such that the operation unit does not execute a process which is to be periodically executed by the operation unit.

8. An image forming method comprising:
a command receiving step of receiving a first print command, wherein the first print command is input through an operation unit that is configured to receive a user's operation, and the operation unit is configured to be controlled by an operating system that is different from an operating system of the image forming apparatus;
a detection step including,
  storing a first state,
  detecting a current state of the operation unit, and
  generating a comparison result based on the current state of the operation unit and the stored first state; and
a control step,
wherein, the control step includes causing the first printing based on the first print command received by the command receiving step to be terminated, in response to the comparison result indicating that the state of the operation unit is a predetermined state subsequent to receiving the first print command by the command receiving step and prior to completion of first printing based on the first print command, and
wherein, the control step includes causing the first printing based on the first print command received by the command receiving step to be executed, in response to the detection step detecting that the current state of the operation unit is not the predetermined state subsequent to receiving the first print command by the command receiving step and prior to the completion of the first printing based on the first print command.

9. The image forming method according to claim 8,
wherein, when the control step causes the first printing based on the first print command received by the command receiving step to be terminated, and subsequently the detection step detects that the current state of the operation unit is not the predetermined state, the control step subsequently causes the first printing to be restarted.

10. The image forming method according to claim 8, further comprising:
a, receiving step of receiving a second print command from an information processing device,
wherein, when the detection step detects that the current state of the operation unit is the predetermined state subsequent to receiving the second print command by the receiving step and prior to completion of second printing based on the second print command, the control step causes the first printing based on the first print command received by the command receiving step to be terminated, and the control step causes the second printing based on the second print command received by the receiving step to be executed, and
wherein, when the detection step detects that the current state of the operation unit is not the predetermined state subsequent to causing the first printing based on the first print command received by the command receiving step to be terminated, the control step subsequently causes the first printing to be restarted.

11. The image forming method according to claim 10,
wherein the detection step detects a state of the information processing device,
wherein, when the detection step detects that the current state of the information processing device is the predetermined state subsequent to receiving the second print command from the information processing device by the receiving step and prior to the completion of the second printing, the control step causes the second printing based on the second print command received by the receiving step to be terminated, and
wherein, when the detection step detects that the current state of the information processing device is not the predetermined state subsequent to receiving the second print command from the information processing device by the receiving step and prior to the completion of the second printing, the control step causes the second printing based on the second print command received by the receiving step to be executed.

12. The image forming method according to claim 8,
wherein the control step causes the first printing to be restarted subsequent to elapsing a predetermined time period from a moment at which the control step causes the first printing based on the first print command received by the command receiving step to be terminated.

13. The image forming method according to claim 8,
wherein, when the control step causes the first printing to be terminated, the control step records a log for identifying the first print command for the first printing which is to be terminated.

14. The image forming method according to claim 8,
wherein the predetermined state is a first state or a second state, wherein the first state is such that, when a signal is transmitted to the operation unit, no responses are received from the operation unit, and the second state is such that the operation unit does not execute a process which is to be periodically executed by the operation unit.

15. A print system that includes an image forming apparatus and an information processing device, wherein the information processing device includes a transmitter configured to transmit print data to the image forming apparatus,
wherein the image forming apparatus comprises:
a first receiver configured to receive the print data from the information processing device;
a command receiving unit configured to receive a first print command, wherein the first print command is input through an operation unit that is configured to receive' a user's operation, and the operation unit is configured to be controlled by an operating system That is different from an operating system of the image forming apparatus; and
a controller configured to,
store a first state,
detect a current state of the operation unit, and
generate a comparison result based on the current state of the operation unit and the stored first state,
wherein the controller is configured such that, in response to the comparison result indicating that the current state of the operation unit is a predetermined state subsequent to receiving the first print command by the command receiving unit and prior to completion of first printing based on the first print command, the controller causes the first printing based on the first print command received by the command receiving unit to be terminated, and
wherein the controller is configured such that, in response to the comparison result indicating that the current state of the operation unit is not the predetermined state subsequent to receiving the first print command by the command receiving unit and prior to the completion of the first printing based on the first print command, the controller causes the first printing based on the first print command received by the command receiving unit to be executed.

* * * * *